(12) United States Patent
Karashima et al.

(10) Patent No.: US 11,125,284 B2
(45) Date of Patent: Sep. 21, 2021

(54) BRAKE DUST COVER

(71) Applicant: TOYOTA JIDOSHA KABUSHIKI KAISHA, Toyota (JP)

(72) Inventors: Yuta Karashima, Miyoshi (JP); Takeshi Ejiri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 16/453,075

(22) Filed: Jun. 26, 2019

(65) Prior Publication Data

US 2020/0096063 A1 Mar. 26, 2020

(30) Foreign Application Priority Data

Sep. 20, 2018 (JP) .............................. JP2018-175618

(51) Int. Cl.
*F16D 55/00* (2006.01)
*F16D 65/00* (2006.01)

(52) U.S. Cl.
CPC ......... *F16D 55/00* (2013.01); *F16D 65/0081* (2013.01); *F16D 65/0025* (2013.01); *F16D 2055/0037* (2013.01)

(58) Field of Classification Search
CPC ..................... F16D 2055/0037; F16D 65/0081
USPC .................................. 188/218 A; 301/37.101
See application file for complete search history.

(56) References Cited

U.S. PATENT DOCUMENTS

| 4,253,552 | A | * | 3/1981 | Shibatani | ................ | B60T 1/065 |
| | | | | | | 188/2 R |
| 4,473,139 | A | * | 9/1984 | Oka | ........................ | F16D 55/22 |
| | | | | | | 188/218 A |
| 4,484,667 | A | * | 11/1984 | Bottieri, Jr. | ............. | B60C 23/18 |
| | | | | | | 188/218 A |
| 7,866,450 | B2 | * | 1/2011 | Nakamura | .............. | F16D 55/00 |
| | | | | | | 188/218 A |
| 8,365,883 | B2 | * | 2/2013 | Matsubayashi | .......... | B62J 15/00 |
| | | | | | | 188/218 A |
| 9,239,087 | B2 | * | 1/2016 | Frantz | ..................... | F16D 55/00 |
| 2008/0053762 | A1 | | 3/2008 | Nakamura et al. | | |

(Continued)

FOREIGN PATENT DOCUMENTS

| JP | 2008-057707 A | 3/2008 |
| JP | 2012-026488 A | 2/2012 |

(Continued)

*Primary Examiner* — Thomas J Williams
(74) *Attorney, Agent, or Firm* — Sughrue Mion, PLLC

(57) ABSTRACT

A brake dust cover includes an annular plate in which a cutout for avoidance of a brake caliper is provided in a first predetermined angle region, and a cover portion that overhangs to one side in an axial direction of the annular plate and covers an outer peripheral surface of a brake disc rotor is included at an outer periphery of a second predetermined angle region. The annular plate includes a small diameter region disposed in a third predetermined angle region other than the second predetermined angle region. In the annular plate, an outer diameter of the third predetermined angle region is smaller than an outer diameter of the second predetermined angle region. The annular plate does not include, in the small diameter region, a portion that overhangs to one side in the axial direction of the annular plate and covers the outer peripheral surface of the brake disc rotor.

3 Claims, 4 Drawing Sheets

(56) References Cited

U.S. PATENT DOCUMENTS

2018/0094684 A1* 4/2018 Kobayashi .......... F16D 65/0081
2020/0116221 A1* 4/2020 Ogawa .................... F16D 55/00

FOREIGN PATENT DOCUMENTS

JP          6475678 B2 *  2/2019   ........... F16D 65/847
KR       20120041391 A  *  5/2012   ..... F16D 2055/0037

* cited by examiner

BRAKE DUST COVER

INCORPORATION BY REFERENCE

The disclosure of Japanese Patent Application No. 2018-175618 filed on Sep. 20, 2018 including the specification, drawings and abstract is incorporated herein by reference in its entirety.

BACKGROUND

1. Technical Field

The present disclosure relates to a brake dust cover for a vehicle such as an automobile.

2. Description of Related Art

For example, Japanese Patent No. 4737769 (JP 4737769 B) (Japanese Unexamined Patent Application Publication No. 2008-057707 (JP 2008-057707 A)) discloses a brake disc guard in which a cutout for avoidance of a brake caliper is provided in a predetermined angle region of a circumference of the brake disc guard and the outer diameter of the predetermined angle region of the circumference is formed to be larger than the outer diameter of a region other than the predetermined angle region, and a flange that overhangs to one side in an axial direction and covers the outer peripheral surface of a brake disc rotor is provided near an outer periphery of the large diameter region.

SUMMARY

In JP 4737769 B (JP 2008-057707 A), there is no description regarding a radially inward cutout that is provided between the large diameter region and the region having a smaller diameter than the large diameter region.

The present disclosure provides a brake dust cover that makes it difficult for muddy water to splash on a brake disc rotor, while attaining a reduction in weight.

An aspect of the present disclosure relates to a brake dust cover including an annular plate in which a cutout for avoidance of a brake caliper is provided in a first predetermined angle region in a circumferential direction. The annular plate includes a cover portion that overhangs to one side in an axial direction of the annular plate and covers an outer peripheral surface of a brake disc rotor, at an outer periphery of a second predetermined angle region in the circumferential direction, and the annular plate includes a small diameter region that is disposed in a third predetermined angle region other than the second predetermined angle region provided with the cover portion. In the annular plate, an outer diameter of the third predetermined angle region in which the small diameter region is disposed is smaller than an outer diameter of the second predetermined angle region in which the cover portion is disposed, the annular plate does not include, in the small diameter region, a portion that overhangs to one side in the axial direction of the annular plate and covers the outer peripheral surface of the brake disc rotor, and the annular plate includes a cutout that is disposed at a boundary between the small diameter region and the second predetermined angle region and extends further inward in a radial direction than an outer peripheral edge of the small diameter region.

According to the above aspect, since the small diameter region is provided in a predetermined angle region of the circumference of the brake dust cover and the cover portion is not provided in the small diameter region, it is possible to attain a reduction in weight.

Here, when the small diameter region is provided at a place (the vehicle lower side and the vehicle rear side) where it is difficult for mud or water during traveling in rainy weather to splash on the brake disc rotor, even though the small diameter region is provided in order to attain the reduction in weight, it is possible to restrain mud or water from splashing on the brake disc rotor, and therefore, it is possible to restrain the brake performance from being adversely affected, even during traveling in rainy weather.

Furthermore, since the cutout is provided at the boundary between the angle region provided with the cover portion and the small diameter region, it becomes possible to avoid concentration of stress on the boundary between the angle region provided with the cover portion and the small diameter region.

In the brake dust cover according to the above aspect, the small diameter region may be disposed at a vehicle lower side portion and a vehicle rear side portion of the annular plate.

In general, in the brake disc rotor of a vehicle, it can be said that a region on the vehicle lower side and the vehicle rear side is a place where it is difficult for mud or water during traveling in rainy weather to splash on the brake disc rotor. For this reason, in the above configuration, in other words, the small diameter region is disposed in a place (the vehicle lower side and the vehicle rear side) where it is difficult for mud or water during traveling in rainy weather to splash on the brake disc rotor. In this way, it becomes apparent that it is possible to restrain the brake performance during traveling in rainy weather from being adversely affected.

In the brake dust cover according to the above aspect, the annular plate may include a U-shaped bead that is provided at an outer peripheral edge of each of the small diameter region and the second predetermined angle region provided with the cover portion.

According to the above aspect, the strength of the outer periphery side of the brake dust cover can be improved due to the beads, and therefore, it becomes possible to restrain occurrence of a wavy distortion or the like in the circumferential direction of the outer periphery side of the brake dust cover.

According to the aspect of the present disclosure, it is possible to provide a brake dust cover that makes it difficult for muddy water to splash on a brake disc rotor while attaining a reduction in weight.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
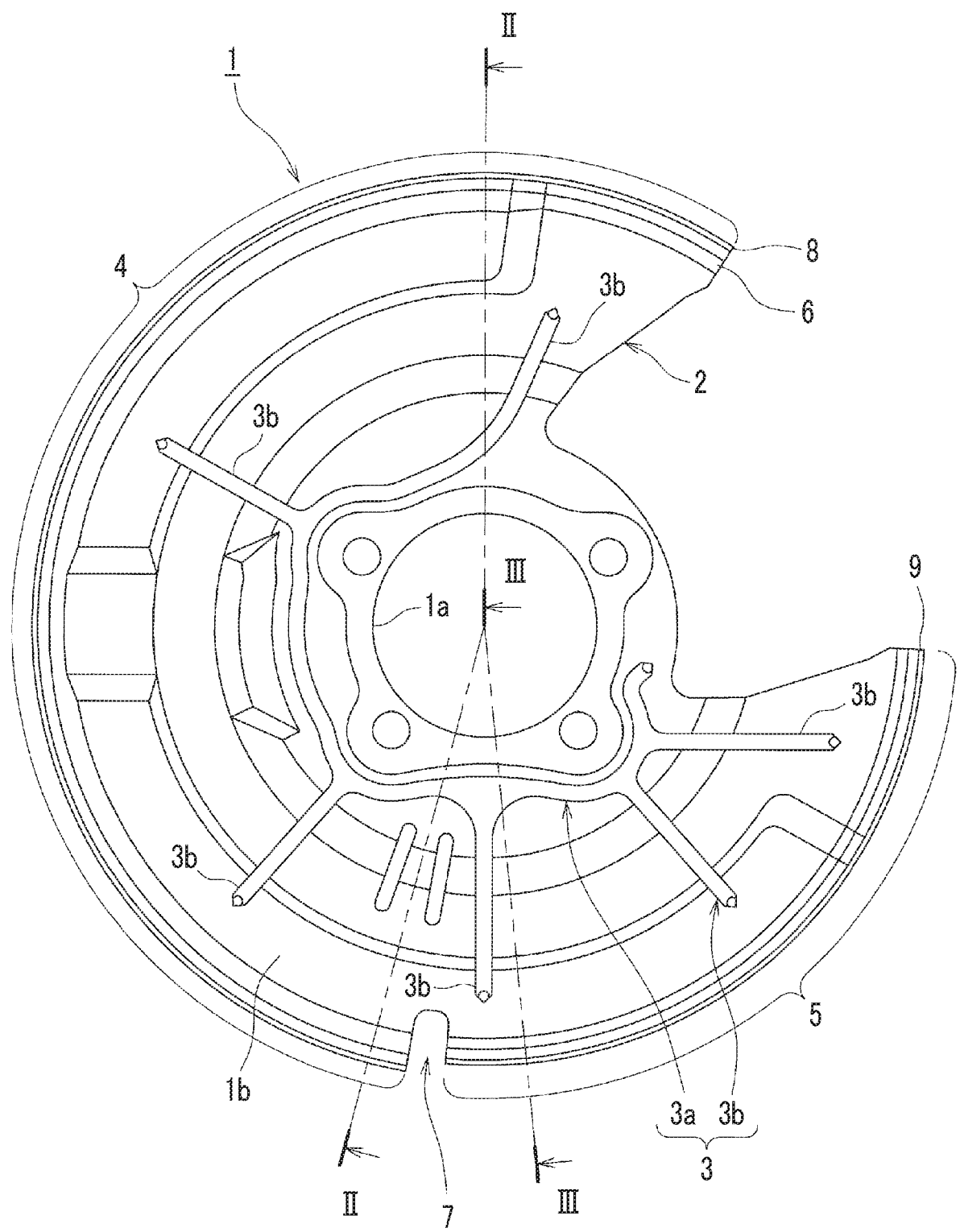
FIG. 1 is a rear view of an embodiment of a brake dust cover according to an aspect of the present disclosure, as viewed toward the outside from the vehicle inner side.

Hereinafter, an embodiment for carrying out the present disclosure will be described in detail with reference to the accompanying drawings.

FIGS. 1 to 4 show an embodiment of the present disclosure. In the drawings, reference numeral 1 denotes the entire brake dust cover.

The brake dust cover 1 of the illustrated example is used for a right rear wheel brake disc rotor 10 (slightly visible in FIG. 4) and is made of an annular plate having a fan-shaped cutout 2 provided in a predetermined angle region on the circumference.

The cutout 2 is provided in order to avoid interference with a brake caliper (not shown).

A bead 3 is provided in a region except for the cutout 2 in the periphery of a center hole 1a of the brake dust cover 1.

The bead 3 includes a main body portion 3a and a branch portion 3b. The main body portion 3a is provided so as to extend in a circumferential direction in the periphery of the center hole 1a of the brake dust cover 1. The branch portions 3b are branched so as to extend outward in a radial direction from several positions (for example, six positions) in a longitudinal direction of the main body portion 3a.

The main body portion 3a is formed in the form such as a C-shape in FIG. 1. The branch portion 3b is formed so as to linearly extend in the radial direction from the center of the brake dust cover 1 in FIG. 1. Each of the main body portion 3a and the branch portion 3b of the bead 3 has a U-shaped cross-sectional shape.

Although not shown in the drawings, the brake dust cover 1 is installed at a vehicle in a state where the cutout 2 is disposed corresponding to the disposition of the brake caliper in the vehicle in a vehicle rear half region (a right half region in FIG. 1) and a vehicle upper half region.

A cover portion 6 that overhangs to one side in an axial direction (the vehicle outer side) and covers the outer peripheral surface of the brake disc rotor 10 is provided at an outer periphery of a predetermined angle region 4 of a cylinder of the brake dust cover 1.

An angle region other than the angle region 4 includes a small diameter region 5. The outer diameter of the small diameter region 5 is formed to be smaller than the outer diameter of the angle region 4 provided with the cover portion 6, whereby the small diameter region 5 is in a state where the cover portion 6 as described above is not provided.

The angle region 4 provided with the cover portion 6 has a diameter larger than the outer diameter of the small diameter region 5, and therefore, the angle region 4 provided with the cover portion 6 is hereinafter referred to as a "large diameter region".

The large diameter region 4 is disposed on the vehicle front side, and the small diameter region 5 is disposed on the vehicle lower side and the vehicle rear side.

A slit-shaped cutout 7 extending further inward in the radial direction than the outer peripheral edge of the small diameter region 5 is provided at the boundary between the large diameter region 4 and the small diameter region 5.

The cutout 7 is provided on the vehicle front side in the vicinity of the branch portion 3b of the bead 3, which is located immediately below, as shown in FIG. 1. An inner end of the cutout 7 is located at a midway position in the radial direction of an outermost annular plate portion 1b and further on the outer diameter side than an outer end of the bead 3 immediately below.

The cutout 7 is provided in order to avoid the concentration of stress on the boundary between the large diameter region 4 and the small diameter region 5. Incidentally, in a case where the cutout 7 is not provided at the boundary between the large diameter region 4 and the small diameter region 5 and a right-angled step is provided at the boundary between the large diameter region 4 and the small diameter region 5, there is a concern that stress may be concentrated on an inner corner of the step.

Figure 2:
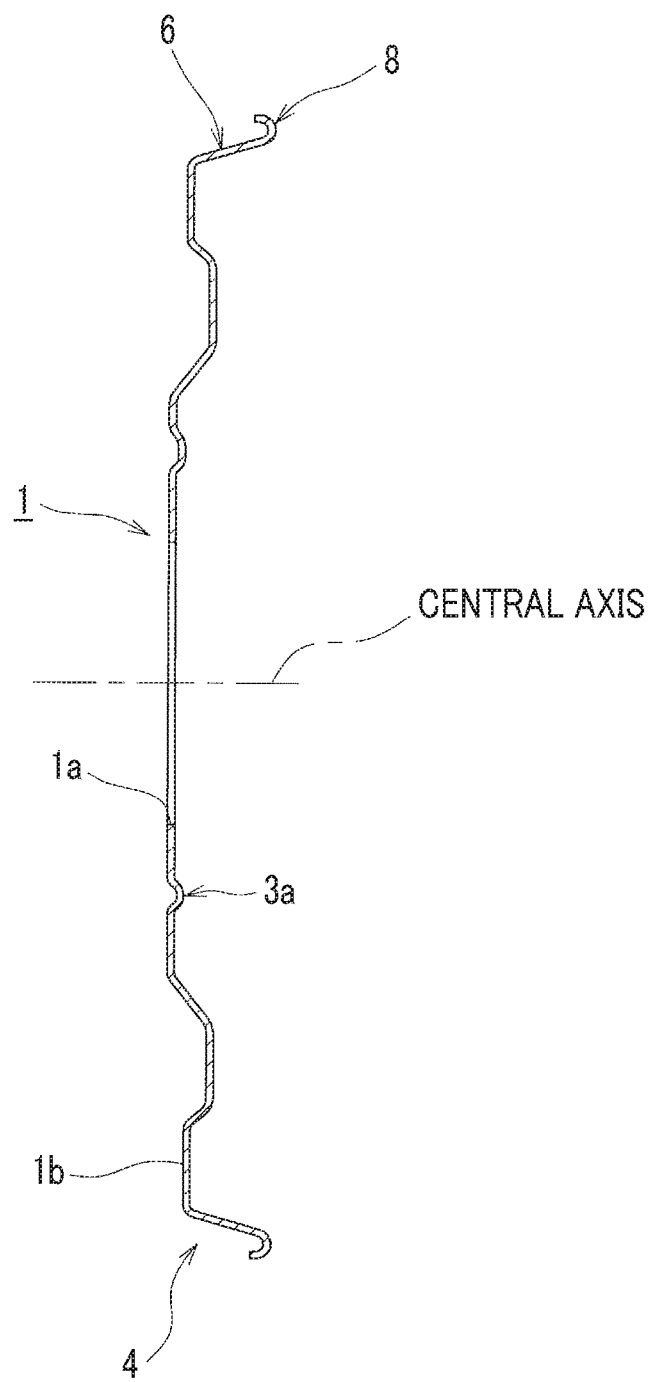
FIG. 2 is a sectional view taken along line II-II of FIG. 1 and viewed in the direction of an arrow.
Figure 3:
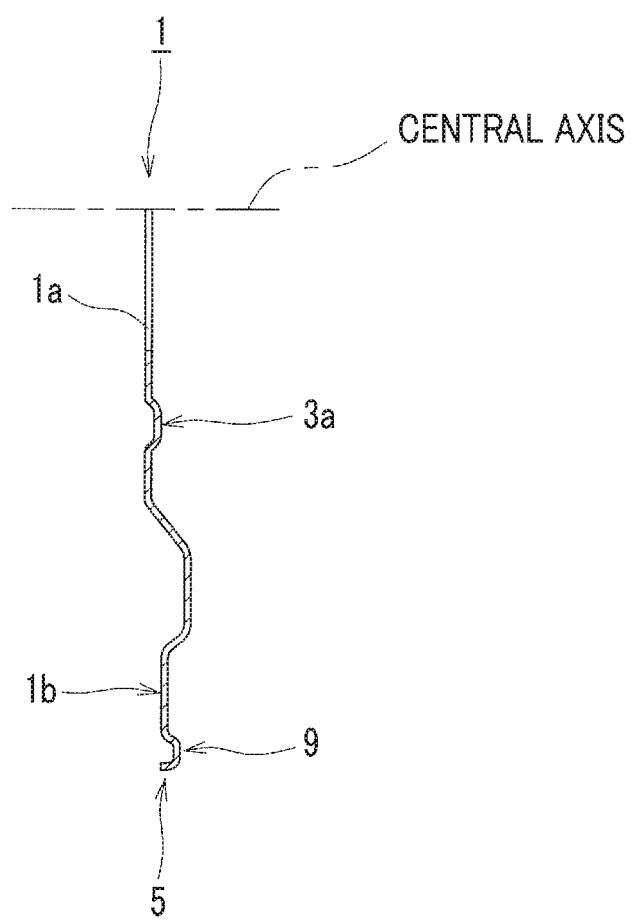
FIG. 3 is a sectional view taken along line III-III of FIG. 1 and viewed in the direction of an arrow.
Figure 4:
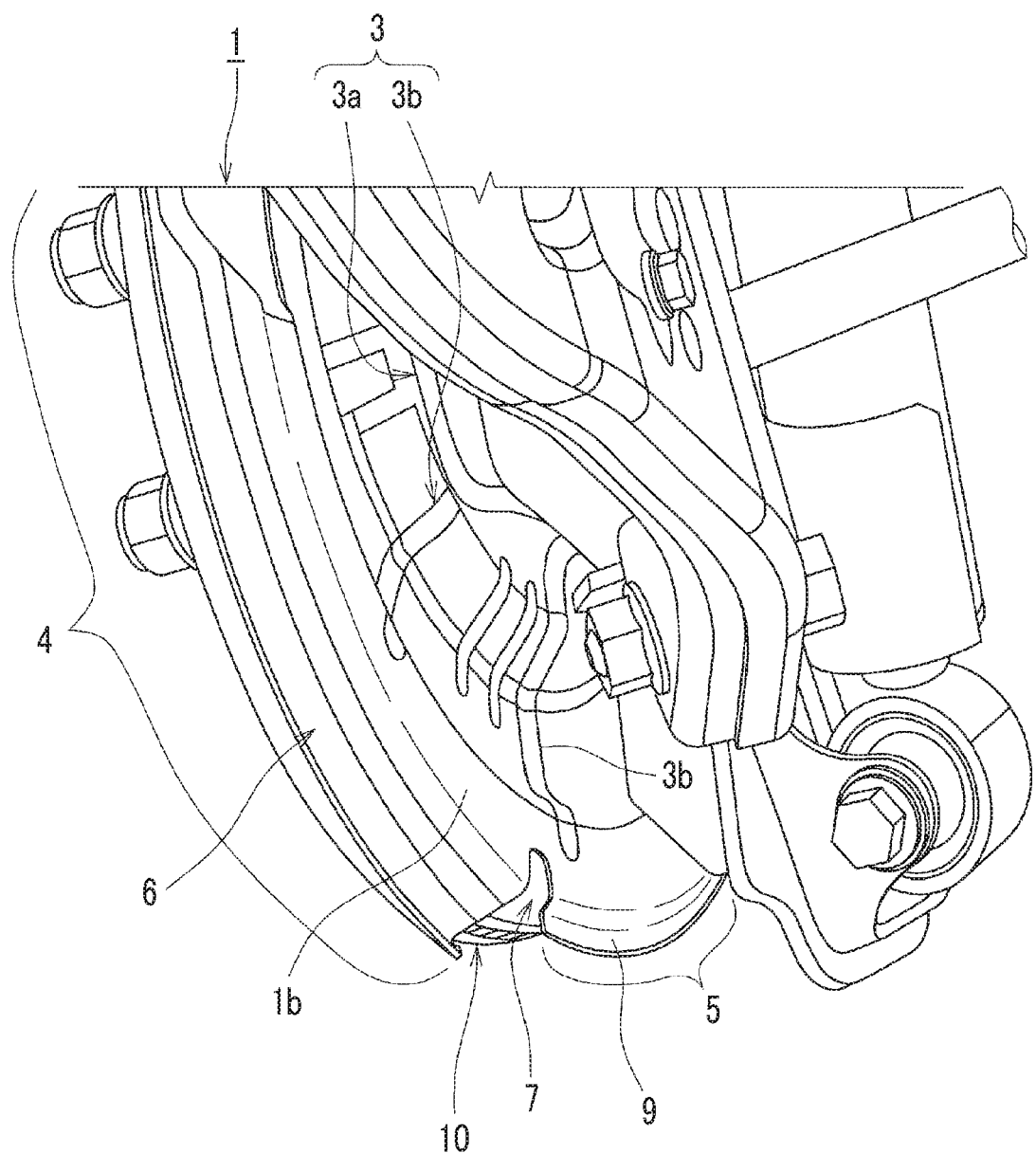
FIG. 4 is a perspective view showing a use state of the brake dust cover of FIG. 1.

Beads 8, 9 are respectively provided at outer peripheral edges of the large diameter region 4 and the small diameter region 5. The beads 8, 9 have a U-shaped cross-sectional shape, as shown in FIGS. 2 and 3, and are provided for reinforcement such that a wavy distortion in the circumferential direction of the outer periphery side of the brake dust cover 1 does not occur. The existence of not only the beads 8, 9 but also the cutout 7 is useful for restraining the occurrence of the distortion.

As described above, according to the embodiment, the strength of the entire brake dust cover 1 can be improved due to the beads 3, 8, 9, and since the small diameter region 5 is provided at a place (the vehicle lower side and the vehicle rear side) where it is difficult for mud or water during traveling in rainy weather to splash on the brake disc rotor 10, in the brake dust cover 1, and the cover portion 6 is not provided in the small diameter region 5, it is possible to restrain the brake performance from being adversely affected, such as being capable of restraining mud or water from splashing on the brake disc rotor 10 during traveling in rainy weather, while attaining a reduction in the weight of the brake dust cover 1.

The applicable embodiment of the present disclosure is not limited to solely the embodiment described above and can be appropriately changed within the claims and within the scope equivalent to the claims.

For example, in the embodiment described above, the outer diameter dimension of the small diameter region 5 is not particularly limited, and it is desirable to optionally set the outer diameter dimension of the small diameter region 5 by checking the degree to which muddy water is difficult to splash on the brake disc rotor 10, by a rainy weather traveling test or the like.

The embodiments of the present disclosure can be suitably used for a brake dust cover.

What is claimed is:

1. A brake dust cover comprising an annular plate in which a recess for avoidance of a brake caliper is provided in a first predetermined angle region in a circumferential direction, wherein:
the annular plate includes a cover portion that overhangs to one side in an axial direction of the annular plate and covers an outer peripheral surface of a brake disc rotor, at an outer periphery of a second predetermined angle region in the circumferential direction;
the annular plate includes a small diameter region that is disposed in a third predetermined angle region other than the second predetermined angle region provided with the cover portion;
in the annular plate, an outer diameter of the third predetermined angle region in which the small diameter region is disposed is smaller than an outer diameter of the second predetermined angle region in which the cover portion is disposed;

the annular plate does not include, in the small diameter region, a portion that overhangs to one side in the axial direction of the annular plate and covers the outer peripheral surface of the brake disc rotor;

the annular plate includes a cutout that is disposed at a boundary between the small diameter region and the second predetermined angle region and extends further inward in a radial direction than an outer peripheral edge of the small diameter region; and the cutout is only provided at the boundary between the small diameter region and the second predetermined angle region.

2. The brake dust cover according to claim 1, wherein the small diameter region is disposed at a vehicle lower side portion and a vehicle rear side portion of the annular plate.

3. The brake dust cover according to claim 1, wherein the annular plate includes a U-shaped bead that is provided at an outer peripheral edge of each of the small diameter region and the second predetermined angle region provided with the cover portion.

* * * * *